United States Patent [19]

Ueno et al.

[11] Patent Number: 5,354,795

[45] Date of Patent: Oct. 11, 1994

[54] POLYPROPYLENE RESIN COMPOSITION HAVING IMPROVED COATING PROPERTY

[75] Inventors: Kohhei Ueno, Sakai; Yoshifumi Nakano, Kishiwada; Kazuyoshi Tanaka, Izumi; Yasuo Kita, Sakai, all of Japan

[73] Assignee: UBE Industries, Ltd., Ube, Japan

[21] Appl. No.: 62,251

[22] Filed: May 17, 1993

Related U.S. Application Data

[63] Continuation of Ser. No. 933,898, Aug. 24, 1992, abandoned, which is a continuation of Ser. No. 633,792, Dec. 26, 1990, abandoned.

[30] Foreign Application Priority Data

Dec. 27, 1989 [JP] Japan .................................. 1-336289
Mar. 2, 1990 [JP] Japan .................................. 2-49344

[51] Int. Cl.$^5$ .......................... C08K 5/34; C08K 3/26; C08K 3/18; C08K 3/22
[52] U.S. Cl. ................................ 524/102; 524/94; 524/99; 524/103; 524/291; 524/401; 524/418; 524/427; 524/433; 524/437; 524/451
[58] Field of Search ............... 524/94, 99, 102, 103, 524/291, 401, 418, 427, 433, 437, 451

[56] References Cited

U.S. PATENT DOCUMENTS

| | | | |
|---|---|---|---|
| 4,220,571 | 9/1980 | Rosenberger | 524/291 |
| 4,363,885 | 12/1982 | Fukui et al. | 523/212 |
| 4,565,844 | 1/1986 | Kasahara et al. | 524/291 |
| 4,672,091 | 6/1987 | Berta | 525/88 |
| 4,705,818 | 11/1987 | Kawai et al. | 523/200 |
| 4,960,823 | 10/1990 | Komatsu et al. | 525/88 |
| 4,985,479 | 1/1991 | Nagasaki et al. | 524/291 |
| 5,026,750 | 6/1991 | Ravichandran | 524/102 |
| 5,037,870 | 8/1991 | Gugumus | 524/102 |
| 5,145,893 | 9/1992 | Galbo | 524/102 |

FOREIGN PATENT DOCUMENTS 63-122752 5/1988 Japan .

OTHER PUBLICATIONS

Oct. 16, 1992 Communication from the European Patent Office in Application 90314277.6 with European Search Report and Annex thereto.

*Primary Examiner*—Kriellion S. Morgan
*Attorney, Agent, or Firm*—Finnegan, Henderson, Farabow, Garrett & Dunner

[57] ABSTRACT a polypropylene resin composition comprising:
  (A) a composition of (a) a crystalline ethylene-propylene block copolymer, (b) a thermoplastic elastomer
    having a substantially saturated main chain, and (c) an inorganic filler;
(B) (i) a hindered nitrogen-free phenolic antioxidant;
(ii) a nitrogen-containing hindered phenolic antioxidant;
(iii) a benzotriazole ultraviolet absorber; and
(iv) a hindered amine light stabilizer having a molecular weight of 500 or more or having no N-H bond and having a molecular weight of less than 500, or
(i') a hindered phenolic antioxidant;
(ii') an organic sulfur type antioxidant; and
(iii') a hindered amine light stabilizer having no N-H bond.

5 Claims, No Drawings

POLYPROPYLENE RESIN COMPOSITION HAVING IMPROVED COATING PROPERTY

This application is a continuation of application Ser. No. 07/933,898 filed Aug. 24, 1992 now abandoned which is a continuation of application Ser. No. 07/633,792 filed Dec. 26, 1990 now abandoned.

BACKGROUND OF THE INVENTION

1. Field of the Invention

The present invention relates to a polypropylene resin composition having an excellent coating property after a plasma treatment, and an excellent weathering resistance, which is especially useful for a bumper.

2. Description of the Related Art

A polypropylene resin is widely utilized for automobile parts and various industrial parts, due to its excellent chemical properties, physical properties and moldability, and further, its light weight and relatively low cost. In particular, the use thereof for automobile bumpers is now widespread.

In general, automobile bumpers were used without a coating or when entirely coated, but a partially coated product, i.e., having a portion uncoated, has become popular from the viewpoint of the design demands, and accordingly, a weathering resistance in addition to an excellent coating property is now required of the polypropylene resin.

In general, a bumper made of a polypropylene resin was coated by the following method. Specifically, the surface of the bumper was washed with a halogenbased organic solvent and given a primer coating, and then a top coating was applied over the primer coating.

Currently, to reduce costs and improve productivity, a method is now widely used which comprises washing the surface of a bumper with a halogen-based organic solvent and subjecting the surface of the washed bumper to a plasma treatment, instead of applying the primer coating, and then applying a top coating over the plasma treated surface.

Nevertheless, when the bumper washed with an organic solvent is immediately placed in a plasma treatment tank, an organic solvent vapor volatilized from the surface of the bumper inhibits the generation of the plasma, and thus an effective plasma treatment cannot be conducted. Accordingly, the organic solvent present on the surface of the bumper is removed in a high temperature atmosphere, prior to the plasma treatment.

A polypropylene resin was blended with, for example, various antioxidants and light stabilizers, to enhance the weathering resistance and light stability thereof, but when such a polypropylene resin is molded into a bumper, washed with a solvent and dried in a high temperature atmosphere, these antioxidants and light stabilizers often bleed out onto the surface of the bumper during the above steps, and this brings a problem in that the plasma treatment of a bumper does not improve the coating property.

SUMMARY OF THE INVENTION

Accordingly, the objects of the present invention are to eliminate the above-mentioned problems of the prior art and to provide a polypropylene resin composition having an excellent weathering resistance and having an excellent coating property after a plasma treatment.

Other objects and advantages of the present invention will be apparent from the following description.

In accordance with the present invention, there is provided a polypropylene resin composition comprising:

(i) 100 parts by weight of a composition of
 (a) 45 to 88% by weight of a crystalline ethylenepropylene block copolymer,
 (b) 10 to 35% by weight of a thermoplastic elastomer having a substantially saturated main chain, and
 (c) 2 to 25% by weight of an inorganic filler;
(ii) 0.03 to 0.6 part by weight of a hindered nitrogen-free phenolic antioxidant;
(iii) 0.03 to 0.6 part by weight of a nitrogen-containing hindered phenolic antioxidant;
(iv) 0.03 to 0.5 part by weight of a benzotriazole ultraviolet absorber; and
(v) 0.05 to 1.0 part by weight of a hindered amine light stabilizer having a molecular weight of 500 or more or having no N-H bond and having a molecular weight of less than 500.

In accordance with the present invention, there is also provided a polypropylene resin composition comprising:

(i) 100 parts by weight of a composition of
 (a) 45 to 80% by weight of a crystalline ethylenepropylene block copolymer,
 (b) 15 to 30 % by weight of a thermoplastic elastomer having a substantially saturated main chain, and
 (c) 5 to 25% by weight of an inorganic filler;
(ii) 0.03 to 1.0 part by weight of a hindered phenolic antioxidant;
(iii) 0.01 to 0.5 part by weight of an organic sulfur type antioxidant; and
(iv) 0.05 to 1.0 part by weight of a hindered amine light stabilizer having no N-H bond.

DESCRIPTION OF THE PREFERRED EMBODIMENTS

In the polypropylene resin composition according to the first embodiment of the present invention, the weathering resistance is made compatible with the coating property after a plasma treatment through the use, as an antioxidant, of a nitrogen-containing hindered phenolic antioxidant in combination with a hindered phenolic antioxidant not containing nitrogen, and at the same time, the use as a light stabilizer of a hindered amine having a molecular weight of 500 or more or not having a N-H bond and having a molecular weight of less than 500.

In the polypropylene resin composition of the present invention, the proportions of the individual ingredients are as follows.

The contents of the crystalline ethylene-propylene block copolymer, thermoplastic elastomer and inorganic filler are 45 to 88% by weight (preferably 55 to 80% by weight), 10 to 35% by weight (preferably 15 to 30% by weight), and 2 to 25% by weight (preferably 5 to 22% by weight), respectively, based on 100% by weight in total of the crystalline ethylene-propylene block copolymer, thermoplastic elastomer, and inorganic filler.

When the crystalline-propylene block copolymer content is less than 45% by weight, the flowability of the polypropylene resin composition becomes poor, which makes the molding difficult. On the other hand, when the content is more than 88% by weight, a molded article having a well balanced rigidity and impact resistance cannot be prepared.

When the thermoplastic elastomer content is less than 10% by weight, the impact resistance of the molded article becomes poor, and when the thermoplastic elastomer content is more than 35% by weight, a molded article having a required rigidity cannot be obtained.

When the inorganic filler content is less than 2% by weight, a problem arises in that the rigidity of the molded article is lowered, and when the content is more than 25% by weight, the impact resistance of the molded article is lowered.

The contents of the hindered phenolic antioxidant not containing nitrogen, nitrogen-containing hindered phenolic antioxidant, benzotriazole ultraviolet absorber, and hindered amine light stabilizer are as follows.

Specifically, the hindered phenolic antioxidant not containing nitrogen, nitrogen-containing hindered phenolic antioxidant, benzotriazole ultraviolet absorber and hindered amine light stabilizer, respectively, have the following contents based on 100% by weight in total of the crystalline ethylene-propylene block copolymer, thermoplastic elastomer, and inorganic filler.

(a) Hindered phenolic antioxidant not containing nitrogen . . . 0.03 to 0.6 part by weight (preferably 0.1 to 0.4 part by weight)

(b) Nitrogen-containing hindered phenolic antioxidant . . . 0.03 to 0.6 part by weight (preferably 0.1 to 0.4 part by weight)

(c) Benzotriazole ultraviolet absorber . . . 0.03 to 0.5 part by weight (preferably 0.1 to 0.4 part by weight)

(d) Hindered amine light stabilizer . . . 0.05 to 1.0 part by weight (preferably 0.1 to 0.8 part by weight)

When the content of the hindered phenolic antioxidant not containing nitrogen, nitrogen-containing hindered phenolic antioxidant, benzotriazole ultraviolet absorber or hindered amine light stabilizer is less than the above-described content range, the weathering resistance is too low, and when the content is more than the above-described content range, the above-described antioxidant or the like often bleeds out, and thus the coating property is poor.

In the polypropylene resin composition according to the second embodiment of the present invention, the weathering resistance is made compatible with the coating property after a plasma treatment through the use, as an antioxidant, of a hindered phenolic antioxidant in combination with an organic sulfur type antioxidant, and at the same time, the use as a light stabilizer of a hindered amine not having a N-H bond.

In the polypropylene resin composition according to the second embodiment of the present invention, the proportions of the individual ingredients are as follows.

The contents of the crystalline ethylene-propylene block copolymer, thermoplastic elastomer and inorganic filler are 45 to 80% by weight (preferably 55 to 73% by weight), 15 to 30% by weight (preferably 20 to 30% by weight), and 5 to 25% by weight (preferably 7 to 20% by weight), respectively, based on 100% by weight in total of the crystalline ethylene-propylene block copolymer, thermoplastic elastomer, and inorganic filler.

When the crystalline-propylene block copolymer content is less than 45 % by weight, the flowability of the polypropylene resin composition becomes poor, which makes the molding difficult. On the other hand, when the content is more than 80% by weight, a molded article having a well balanced rigidity and impact resistance cannot be prepared.

When the thermoplastic elastomer content is less than 15% by weight, the impact resistance of the molded article and coatability becomes poor, and when the thermoplastic elastomer content is more than 30% by weight, a molded article having a required rigidity cannot be obtained.

When the inorganic filler content is less than 5% by weight, a problem arises in that the rigidity and coatability of the molded article are lowered, and when the content is more than 25% by weight, the impact resistance of the molded article is lowered.

The contents of the hindered phenolic antioxidant, organic sulfur type antioxidant, and hindered amine light stabilizer based on 100% by weight in total of the crystalline ethylene-propylene block copolymer, thermoplastic elastomer, and inorganic filler are as follows.

(a) Hindered phenolic antioxidant . . . 0.03 to 1.0 part by weight (b) Organic sulfur type antioxidant . . . 0.01 to 0.5 part by weight (c) Hindered amine light stabilizer having no N-H bond . . . 0.05 to 1.0 part by weight When the content of the hindered phenolic antioxidant, organic sulfur type antioxidant, or hindered amine light stabilizer is less than the above-described content range, the weathering resistance is too low, and when the content is more than the above-described content range, the above-described antioxidant or the like often bleeds out, and thus the coating property is poor. In addition, when the content of the organic sulfur type antioxidant is more than the above-described content range, the weathering resistance is decreased.

Each ingredient of the composition of the present invention will now be described.

The crystalline ethylene-propylene block copolymer has an ethylene content of 5 to 25% by weight (preferably 6 to 20% by weight) and an MFR (melt flow rate) of 10 to 70 g/10 min (preferably 10 to 45 g/10 min).

When the ethylene content is less than 5% by weight, the impact resistance of a molded article prepared by molding the propylene resin composition of the present invention is unfavorably lowered, and when the ethylene content is more than 25% by weight, the rigidity of the molded article is lowered.

When the MFR value is less than 10 g/10 min, the moldability is poor and the appearance of the molded article is also poor, and when the MFR value is more than 70 g/10 min, the dispersibility of the thermoplastic elastomer or the like becomes poor, and thus the impact resistance is lowered.

The main chain of the thermoplastic elastomer must be in a substantially saturated state. Specific examples of the thermoplastic elastomer include hydrogenated products of ethylene-propylene copolymer rubbers, ethylene-propylene-diene terpolymer rubbers, ethylene-butene copolymer rubbers, styrene-butadiene or styrene-isoprene block, or random copolymer rubber. These rubbers may be used alone or in any mixture thereof.

Examples of the inorganic filler include talc, calcium carbonate, calcium oxide, calcium hydroxide, magnesium carbonate, magnesium hydroxide, magnesium oxide, aluminum hydroxide, magnesium sulfate, barium sulfate, glass powder, clay, dolomite, mica, silica, alumina, potassium titanate, wollastonite, fibrous magnesium oxysulfate, and glass fiber. These inorganic filler may be used alone or in any combination of two or more thereof. Talc, calcium carbonate, barium sulfate and (2) AO-2 ... octadecyl-3-(3,5-di-tert-butyl-4-hydroxyphenyl)propionate (3) AO-3 ... pentaerythrityl-tetrakis [3-(3,5-di-tert-butyl-4-hydroxyphenyl) propionate]

(2) Nitrogen-containing hindered phenolic antioxidants:

(1) NAO-1 ... 1,3,5-tris(3,5-di-tert-butyl-4-hydroxybenzyl)-S-triazine-2,4,6-(1H, 3H, 5H)trione (2) NAO-2 ... 2,4-bis(n-octylthio)-6-(4-hydroxy-3,5-di-tert-butylanilino)-1,3,5-triazine (3) Organic sulfur type antioxidants (1) SAO-1 ... dilauryl-3,3'-thiodipropionate (2) SAO-2 ... distearyl-3,3'-thiodipropionate (4) Benzotriazole ultraviolet absorbers:

(1) UV-1 ... 2-(3-tert-butyl-5-methyl-2-hydroxyphenyl)-5-chlorobenzotriazole (2) UV-2 ... 2,2-methylene-bis[4-(1,1,3,3-tetramethylbutyl)-6-(2H-benzotriazole-2-yl)phenol]

(5) Hindered amine light stabilizers either having a molecular weight of 500 or more, or not having a N-H bond and having a molecular weight of less than 500:

(1) HALS-1 ... dimethyl succinate-1-(2-hydroxyethyl)-4-hydroxy-2,2,6,6-tetramethylpiperidine polycondensation product (2) HALS-2 ... bis(1,2,2,6,6-pentamethyl-4-piperidyl) sebacate (3) HALS-3 ... 1,2,3,4-butanetetracarboxylic acid-1,2,2,6,6-pentamethyl-4-piperidinol tridecyl alcohol condensation product (4) HALS-4 ... 8-benzyl-7,7,9,9-tetramethyl-3-octyl-1,3,8-triazaspiro[4,5]undecane-2,4-dione (6) Other hindered amine light stabilizers:

(1) HALS-5 ... bis(2,2,6,6-tetramethyl-4-piperidyl) sebacate (2) HALS-6 ... 4-benzoyloxy-2,2,6,6-tetramethylpiperidine (3) HALS-7 ... tetrakis (2,2,6,6-tetramethyl4-piperidyl)-1,2,3,4-butanetetracarboxylate Example 1

(1) Crystalline ethylene-propylene block copolymer (PP-1)

(a) Ethylene content: 7.5% by weight (b) MFR 20 g/10 min 65% by weight (2) Ethylene-propylene copolymer rubber (EPR-1)

(a) Ethylene content: 75% by weight (b) Mooney viscosity (ML$_{1+4}$ 100° C.) 20 ... 25% by weight (3) Talc (average particle diameter: 2.5 μm) ... 10 % by weight (4) 100 parts by weight in total of the above materials (1), (2) and (3) were blended with the following materials:

(1) Hindered phenolic antioxidant not containing nitrogen AO-2 ... 0.2 part by weight (2) Nitrogen-containing hindered phenolic antioxidant NAO-1 ... 0.2 part by weight (3) Benzotriazole ultraviolet absorber UV-1 ... 0.2 part by weight (4) Hindered amine light stabilizer HALS-1 ... 0.3 part by weight (5) Carbon black (pigment) ... 0.1 part by weight (6) Magnesium stearate ... 0.2 part by weight These materials were mixed by a Henschel mixer, melt-kneaded by a biaxial extruder set at 230° C., and pelletized to prepare a polypropylene resin composition.

The above-described polypropylene resin composition was injection-molded to prepare a flat plate test piece having a size of 50 mm ×90 mm×2 mm for a measurement of the properties thereof.

The flat plate test piece was exposed to a saturated vapor of 1,1,1-trichloroethane for 30 sec, the surface thereof was washed, and the test piece then dried in an oven set at 90° C., for 10 min.

Thereafter, a plasma treatment was conducted. The conditions of the plasma treatment were as follows.

| Degree of vacuum | 1.0 Torr |
|---|---|
| Output of microwave | 0.05 kw |
| Treating time | 0.3 sec |
| Gas flow rate | 600 cc/min |
| Treating gas | air |

After the plasma treatment, the test piece was coated with a two-component polyurethane coating as a top coating, to a coating thickness of 40 μm. The coating was dried at 120° C. for 30 min, and allowed to stand at room temperature for 48 hr to prepare a coated product.

The coating property of the coated products was then evaluated. First, cross-cuts were provided in the coating of the test piece, by a cutter knife, to divide the coating into 100 1 mm square sections, then Cello Tape ® was pressed thereover and peeled therefrom, and the number of sections at which the coating had peeled off was counted.

The coating property was evaluated as ○ when peeling occurred in none of the sections, Δ when peeling occurred in 1 to 10 sections among 100 sections, and x when peeling occurred in 11 sections or more among 100 sections.

Further, the weather resistance was evaluated on a test piece subjected to the plasma treatment only. The evaluation of the weather resistance was conducted by measuring a time taken for a crack to become observable at a magnification of ×50, by using a sunshine weatherometer under the condition of a black panel temperature of 83° C.

A test piece was used for the measurement of the physical properties, and the bending modulus and Izod impact strength were measured. The bending modulus and Izod impact strength were measured according to ASTM D-790 and ASTM D-258, respectively.

The results of the measurements of the coating property and the physical properties are shown in Table 1.

Example 2

A composition was prepared, molded into a test piece, and the coating property and weathering resistance evaluated in the same manner as that of Example 1, except that HALS-2 was used as the hindered amine light stabilizer instead of HALS-1. The results are shown in Table 1. In this Example, no measurement was made of the bending modulus and Izod impact resistance.

Example 3

A composition was prepared, molded into a test piece, and the coating property and weathering resistance evaluated in the same manner as that of Example 1, except that HALS-3 was used as the hindered amine light stabilizer instead of HALS-1. The results are shown in Table 1. In this Example, no measurement was fibrous magnesium oxysulfate are particularly preferred as the inorganic filler.

The average particle diameter (in the case of a spherical or flaky form) of the inorganic filler or average fiber diameter (in the case of a needle or fibrous form) is preferably 5 μm or less, more preferably 4 μm or less, most preferably 1 to 3 μm. Preferably the content of the inorganic filler having a particle diameter or fiber diameter of 8 μm or more is 1% by weight or less. When the average particle diameter or average fiber diameter is more than 5 μm, the impact resistance of the molded article is unfavorably lowered.

Examples of the hindered phenolic antioxidant not containing nitrogen include:

(1) 2,6-di-tert-butyl-4-methylphenol, (2) octadecyl-3-(3,5-di-tert-butyl-4-hydroxy phenyl) propionate, (3) pentaerythrityl-tetrakis [3-(3,5-di-tert-butyl-4-hydroxyphenyl) propionate]

(4) 3,9-bis[1,1-dimethyl-2-{β-(3-tert-butyl-4-hydroxy-5-methylphenyl)propionyloxy}ethyl]-2,4,8,10-tetraoxaspiro(5,5)undecane, (5) triethylene glycol-bis[3-(3-tert-butyl-5-methyl-4-hydroxyphenyl) propionate], and (6) 1,6-hexanediol-bis[3-(3,5-di-tert-butyl-4-hydroxyphenyl) propionate.

Examples of the nitrogen-containing hindered phenolic antioxidant include:

(1) triazine nitrogen-containing hindered phenolic antioxidants such as (a) 1,3,5-tris(3,5-di-tert-butyl-4-hydroxybenzyl)-S-triazine-2,4,6-(1H, 3H, 5H)trione and (b) 2,4-bis(n-octylthio)-6-(4-hydroxy-3,5-di-tert-butylanilino)-1,3,5-triazine, (2) amine nitrogen-containing hindered phenolic antioxidants such as N,N'-hexamethylenebis(3,5-di-tert-butyl-4-hydroxy-hydrocinnamide), and (3) N,N'-bis[3-(3,5-di-tert-butyl-4-hydroxyphenyl)-propionyl]hidrazine.

Among the above, triazine compounds are most preferred.

Examples of the organic sulfur type antioxidant include:

(1) ditridecyl-3,3'-thiodipropionate, (2) 2-mercaptobenzimidazole, (3) dilauryl-3,3'-thiodipropionate, (4) dimyristyl-3,3'-thiodipropionate, (5) distearyl-3,3'-thiodipropionate, (6) pentaerythritol-tetrakis (β-laurylthiopropionate).

Examples of the benzotriazole ultraviolet absorber include:

(1) 2-(3-tert-butyl-5-methyl-2-hydroxyphenyl-5-chlorobenzotriazole, (2) 2,2-methylene-bis[4-(1,1,3,3-tetramethylbutyl)-6-(2H-benzotriazole-2-yl) phenol, (3) 2-(3,5-di-tert-butyl-2-hydroxyphenyl)-5-chlorobenzotriazole, (4) 2-(3,5-di-tert-butyl-2-hydroxyphenyl) benzotriazole, (5) 2-(3,5-di-tert-amyl-2-hydroxyphenyl) benzotriazole, and (6) 2-(5-methyl-2-hydroxyphenyl)benzotriazole, (7) 2[2-hydroxy-3,5-bis(α,α-dimethylbenzyl)phenyl]-2H-benzotriazole.

The hindered amine light stabilizer must have a molecular weight of 500 or more or not have a N-H bond in its molecule and have a molecular weight of less than 500. Examples of the hindered amine light stabilizer of this kind include the following compounds.

Examples of the hindered amine light stabilizer having a molecular weight of 500 or more include:

(1) dimethyl succinate-1-(2-hydroxyethyl)-4-hydroxy-2,2,6,6-tetramethylpiperidine polycondensation product, (2) 1,2,3,4-butanetetracarboxylic acid-2,2,6,6-tetramethyl-4-piperidinol tridecyl alcohol condensation product, (3) 1,2,3,4-butanetetracarboxylic acid-1,2,2,6,6-tetramethyl-4-piperidinol tridecyl alcohol condensation product, (4) poly[[{6-(1,1,3,3-tetramethylbutyl)imino-1,3,5-triazine-2,4-diyl}{(2,2,6,6-tetramethyl-4-piperidyl)imino}]hexamethylene{(2,2,6,6-tetramethyl-4-piperidyl)imino}]

(5) 2-(3,5-di-tert-butyl-4-hydroxybenzyl)-2-n-butyl-malonic acid-bis(1,2,2,6,6-pentamethyl-4-piperidyl), (6) tetrakis(2,2,6,6-tetramethyl-4-piperidyl)-1,2,3,4-butanetetracarboxylate, (7) tetrakis(1,2,2,6,6-tetramethyl-4-piperidyl)-1,2,3,4-butanetetracarboxylate, (8) bis(1,2,2,6,6-pentamethyl-4-piperidyl) sebacate, and (9) 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine.

Examples of the hindered amine light stabilizer not having a N-H bond and having a molecular weight of less than 500 include:

(10) 8-benzyl-7,7,9,9-tetramethyl-3-octyl-1,3,8-triazaspiro[4,5]undecane-2,4-dione.

The above-described compounds (1), (2), (5), (6), (8) and (9) are preferably used in the second embodiment of the present invention, as the hindered amine light stabilizer.

Antioxidants, thermal stabilizers, ultraviolet absorbers, flame retardants, nucleating agents, organic fillers, and inorganic fillers, etc., commonly added to polypropylene resins, may be added as long as the effect of the present invention is not lost.

The composition of the present invention can be prepared by the conventional method. A powder or pellet of a crystalline ethylene-propylene block copolymer is blended with a thermoplastic elastomer, an inorganic filler, a hindered phenolic antioxidant not containing nitrogen, a nitrogen-containing hindered phenolic antioxidant, an organic sulfur type antioxidant, a benzotriazole ultraviolet absorber, and a hindered amine light stabilizer, etc., in a Henschel mixer or the like, and the blend is melt kneaded in a monoaxial or biaxial extruder to prepare the composition of the present invention. Alternatively, the melt kneading may be conducted by using a roll or banbury mixer instead of the monoaxial extruder.

EXAMPLES

The present invention will now be described in more detail by, but is by no means limited to, the following Examples.

The abbreviations of the nitrogen-containing hindered phenolic antioxidants, etc., used in the present Examples are as follows.

(1) Hindered phenolic antioxidants not containing nitrogen:

(1) AO-1 ... 2,6-di-tert-butyl-4-methyl-phenol made of the bending modulus and Izod impact resistance.

Example 4

A composition was prepared, molded into a test piece, and the coating property and weathering resistance evaluated in the same manner as that of Example 1, except that 0.1 part by weight of UV-2 was used as the benzotriazole ultraviolet absorber instead of UV-1. In this Example, no measurement was made of the bending modulus and Izod impact resistance.

Example 5

A composition was prepared, molded into a test piece, and the coating property and weathering resistance evaluated in the same manner as that of Example 1, except that NAO-2 was used as the nitrogen-containing hindered phenolic antioxidant instead of NAO-1 and HALS-2 was used instead of HALS-1 as the hindered amine light stabilizer. In this Example, no measurement was made of the bending modulus and Izod impact resistance. The results are shown in Table 1.

Example 6

A composition was prepared, molded into a test piece, and the coating property and weathering resistance evaluated in the same manner as that of Example 1, except that 0.05 part by weight of AO-1 and 0.1 part by weight of AO-2 and AO-3 were used as the hindered phenolic antioxidant instead of 0.2 part by weight of AO-2 and the proportion of HALS--1 as the hindered amine light stabilizer was increased to 0.6 part by weight. In this Example, no measurement was made of the bending modulus and Izod impact resistance. The results are shown in Table 1.

Example 7

A composition was prepared, molded into a test piece, and the coating property and weathering resistance evaluated in the same manner as that of Example 3, except that the proportion of NAO-1 as the nitrogen-containing hindered phenolic antioxidant was reduced to 0.1 part by weight. In this Example, no measurement was made of the bending modulus and Izod impact resistance. The results are shown in Table 1.

Example 8

A composition was prepared, molded into a test piece, and the coating property and weathering resistance evaluated in the same manner as that of Example 2, except that the proportion of HALS-2 as the hindered amine light stabilizer was increased to 0.6 part by weight. In this Example, no measurement was made of the bending modulus and Izod impact resistance. The results are shown in Table 1.

Example 9

A composition was prepared, molded into a test piece, and the coating property and weathering resistance evaluated in the same manner as that of Example 1, except that the proportion of UV-1 was reduced to 0.1 part by weight and the proportion of HALS-1 was increased to 0.4 part by weight. In this Example, no measurement was made of the bending modulus and Izod impact resistance. The results are shown in Table 1.

Example 10

PP-2 having an ethylene content of 7.5% by weight and a MFR of 30 g/10 min was used as the crystalline ethylene-propylene block copolymer instead of PP-1. Further, HALS-3 was used as the hindered amine light stabilizer instead of HALS-1. A composition was prepared, molded into a test piece, and subjected to measurements of the bending modulus and Izod impact strength and an evaluation of the coating property and weathering resistance, in the same manner as that of Example 4, except for the above-described conditions. The results are shown in Table 1.

Example 11

A composition was prepared, molded into a test piece, and subjected to measurements of the bending modulus and Izod impact strength, and an evaluation of the coating property and weathering resistance, in the same manner as that of Example 10, except that PP-1 was used as the crystalline ethylene-propylene block copolymer instead of PP-2 and a hydrogenation product of a styrene-butadiene block copolymer rubber (SEBS) was used as the thermoplastic elastomer. The results are shown in Table 1.

Example 12

The proportions of the crystalline ethylenepropylene block copolymer and ethylene-propylene copolymer rubber were 62% by weight and 28% by weight, respectively, and talc and fibrous magnesium oxysulfate (MOS) were each used in an amount of 5% by weight as the inorganic filler. The kind and proportion of the hindered phenolic antioxidant were the same as those of Examples 10 and 11.

Thereafter, the bending modulus and Izod impact strength were measured, and the coating property and weathering resistance were evaluated. The results are shown in Table 1.

Example 13

The proportions of the thermoplastic elastomer and talc were reduced to 22% by weight and 5% by weight, respectively. The proportion of the crystalline ethylene-propylene block copolymer was increased to 73% by weight. The resultant composition was molded into a test piece and subjected to measurements of the bending modulus and Izod impact resistance, and an evaluation of the coating property and weathering resistance. The results are shown in Table 1.

Example 14

A composition was prepared, molded into a test piece, and the coating property and weathering resistance evaluated in the same manner as that of Example 1, except that HALS-4 was used as the hindered amine light stabilizer instead of HALS-1. The results are shown in Table 1. In this Example, no measurement was made of the bending modulus and Izod impact resistance.

Comparative Example 1

A composition was prepared, molded into a test piece, and the coating property and weathering resistance evaluated in the same manner as that of Example 1, except that the proportion of HALS-1 as the hindered amine light stabilizer was increased to 1.1 parts by weight. In this Comparative Example, no measurement was made of the bending modulus and Izod impact resistance. The results are shown in Table 1.

Comparative Example 2

A composition was prepared, molded into a test piece, and the coating property and weathering resistance evaluated in the same manner as that of Example 3, except that the proportion of UV-1 as the benzotriazole ultraviolet absorber was increased to 0.7 part by weight. In this Comparative Example, no measurement was made of the bending modulus and Izod impact resistance. The results are shown in Table 1.

Comparative Example 3

A composition was prepared, molded into a test piece, and the coating property and weathering resistance evaluated in the same manner as that of Example 3, except that the proportion of NAO-1 as the nitrogen-containing hindered phenolic antioxidant was increased to 1.2 parts by weight. In this Comparative Example, no measurement was made of the bending modulus and Izod impact resistance. The results are shown in Table 1.

Comparative Example 4

A composition was prepared, molded into a test piece, and the coating property and weathering resistance evaluated in the same manner as that of Example 9, except that no benzotriazole ultraviolet absorber was added. In this Comparative Example, no measurement was made of the bending modulus and Izod impact resistance. The results are shogun in Table 1.

Comparative Example 5

A composition was prepared, molded into a test piece, and the coating property and weathering resistance evaluated in the same manner as that of Example 9, except that no nitrogen-containing hindered phenolic antioxidant was added and the proportion of LFV-1 as the ultraviolet absorber was increased to 0.2 part by weight. In this Comparative Example, no measurement was made of the bending modulus and Izod impact resistance. The results are shown in Table 1.

Comparative Example 6

A composition was prepared, molded into a test piece, and the coating property and weathering resistance evaluated in the same manner as that of Example 1, except that no hindered phenolic antioxidant not containing nitrogen was added. In this Comparative Example, no measurement was made of the bending modulus and Izod impact resistance. The results are shown in Table 1.

Comparative Example 7

A composition was prepared, molded into a test piece, and the coating property and weathering resistance evaluated in the same manner as that of Example 4, except that no hindered amine light stabilizer was added. In this Comparative Example, no measurement was made of the bending modulus and Izod impact resistance. The results are shown in Table 1.

Comparative Example 8

A composition was prepared, molded into a test piece, and the coating property and weathering resistance evaluated in the same manner as that of Example 4, except that HALS-5 was used as the light stabilizer instead of HALS-1. In this Comparative Example, no measurement was made of the bending modulus and Izod impact resistance. The results are shown in Table 1.

Comparative Example 9

A composition was prepared, molded into a test piece, and the coating property and weathering resistance evaluated in the same manner as that of Example 4, except that 0.2 part by weight of HALS-6 was used as the light stabilizer instead of HALS-1. In this Comparative Example, no measurement was made of the bending modulus and Izod impact resistance. The results are shown in Table 1.

Comparative Example 10

The proportion of the crystalline ethylenepropylene block copolymer was increased to 87% by weight, and the proportion of the thermoplastic elastomer was reduced to 5% by weight. The resultant coating was subjected to an evaluation of the coating property and weathering resistance and measurements of the bending modulus and Izod impact strength. The results are shown in Table 1.

Comparative Example 11

A composition containing no inorganic filler was prepared and subjected to an evaluation of the coating property and weathering resistance and measurements of the bending modulus and Izod impact strength. The results are shown in Table 1.

TABLE 1

Proportions based on 100 pts. wt. of composition comprising crystalline ethylene ethylene-propylene block copolymer, thermoplastic elastomer and inorganic filler Total amount: 100 wt. %

| | crystalline ethylene-propylene copolymer | | thermoplastic elastomer | | inorganic filler | | hindered phenolic antioxidant not containing nitrogen | | | nitrogen-containing hindered antioxidant | | benzotriazole ultraviolet absorber | | hindered amine light stabilizer of the present invention | | | | hindered amine light stabilizer other than left one | | Physical properties | | Coating property weathering resistance | |
|---|---|---|---|---|---|---|---|---|---|---|---|---|---|---|---|---|---|---|---|---|---|---|
| | PP-1 wt.% | PP-2 wt.% | EPR-1 wt.% | SEBS wt.% | talc wt.% | MOS wt.% | AO-1 pt.wt. | AO-2 pt.wt. | AO-3 pt.wt. | NAO-1 pt.wt. | NAO-2 pt.wt. | UV-1 pt.wt. | UV-2 pt.wt. | HALS-1 pt.wt. | HALS-2 pt.wt. | HALS-3 pt.wt. | HALS-4 pt.wt. | HALS-5 pt.wt. | HALS-6 pt.wt. | modulus in bending kg/cm² | Izod impact strength | cross-cut peeling test | crack generation time (hr) |
| Ex. 1 | 67 | — | 25 | — | 8 | — | — | 0.2 | — | 0.2 | — | 0.2 | — | 0.3 | — | — | — | — | — | 11500 | 10 | ○ | 1970 |
| Ex. 2 | 67 | — | 25 | — | 8 | — | — | 0.2 | — | 0.2 | — | 0.2 | — | — | 0.3 | — | — | — | — | — | — | ○ | 1950 |
| Ex. 3 | 67 | — | 25 | — | 8 | — | — | 0.2 | — | 0.2 | — | 0.2 | — | — | — | 0.3 | — | — | — | — | — | ○ | 2000 |
| Ex. 4 | 67 | — | 25 | — | 8 | — | — | 0.2 | — | 0.2 | — | — | 0.2 | 0.3 | — | — | — | — | — | — | — | ○ | 1920 |
| Ex. 5 | 67 | — | 25 | — | 8 | — | — | 0.2 | — | — | 0.1 | 0.2 | — | — | 0.3 | — | — | — | — | — | — | ○ | 2100 |
| Ex. 6 | 67 | — | 25 | — | 8 | — | 0.05 | 0.1 | 0.1 | 0.1 | — | 0.2 | — | 0.6 | — | — | — | — | — | — | — | ○ | 2500 |
| Ex. 7 | 67 | — | 25 | — | 8 | — | — | 0.2 | — | 0.2 | — | 0.2 | — | — | — | 0.3 | — | — | — | — | — | ○ | 1910 |
| Ex. 8 | 67 | — | 25 | — | 8 | — | — | 0.2 | — | 0.2 | — | 0.1 | — | — | 0.6 | — | — | — | — | — | — | ○ | 2400 |
| Ex. 9 | 67 | — | 25 | — | 8 | — | — | 0.2 | — | 0.2 | — | — | — | 0.4 | — | — | — | — | — | — | — | ○ | 1900 |
| Ex. 10 | — | 67 | 25 | — | 8 | — | — | 0.2 | — | 0.2 | — | — | 0.2 | — | — | 0.3 | — | — | — | 11800 | 8 | ○ | 1950 |
| Ex. 11 | 67 | — | — | 25 | 8 | — | — | 0.2 | — | 0.2 | — | — | 0.2 | — | — | 0.3 | — | — | — | 12000 | 12 | ○ | 1980 |
| Ex. 12 | 62 | — | 28 | — | 5 | 5 | — | 0.2 | — | 0.2 | — | — | 0.2 | — | — | 0.3 | — | — | — | 12000 | 8 | ○ | 1930 |
| Ex. 13 | 73 | — | 22 | — | 5 | — | — | 0.2 | — | 0.2 | — | — | 0.2 | — | — | 0.3 | — | — | — | 11000 | 12 | ○ | 1950 |
| Ex. 14 | 67 | — | 25 | — | 8 | — | — | 0.2 | — | 0.2 | — | 0.2 | — | — | — | — | 0.3 | — | — | — | — | ○ | 1900 |
| Comp. Ex. 1 | 67 | — | 25 | — | 8 | — | — | 0.2 | — | 0.2 | — | 0.2 | — | 1.1 | — | — | — | — | — | 11500 | 10 | △ | 3200 |
| Comp. Ex. 2 | 67 | — | 25 | — | 8 | — | — | 0.2 | — | 0.2 | — | 0.7 | — | — | — | 0.3 | — | — | — | — | — | × | 2200 |
| Comp. Ex. 3 | 67 | — | 25 | — | 8 | — | — | 0.2 | — | 1.2 | — | 0.2 | — | — | — | 0.3 | — | — | — | — | — | × | 2370 |
| Comp. Ex. 4 | 67 | — | 25 | — | 8 | — | — | 0.2 | — | 0.2 | — | — | — | 0.4 | — | — | — | — | — | — | — | ○ | 1520 |
| Comp. Ex. 5 | 67 | — | 25 | — | 8 | — | — | — | — | 0.2 | — | 0.2 | — | 0.4 | — | — | — | — | — | — | — | ○ | 1400 |
| Comp. Ex. 6 | 67 | — | 25 | — | 8 | — | — | 0.2 | — | 0.2 | — | 0.2 | — | 0.3 | — | — | — | — | — | — | — | ○ | 1500 |
| Comp. Ex. 7 | 67 | — | 25 | — | 8 | — | — | 0.2 | — | 0.2 | — | — | 0.2 | — | — | — | — | — | — | — | — | ○ | 400 |
| Comp. Ex. 8 | 67 | — | 25 | — | 8 | — | — | 0.2 | — | 0.2 | — | — | 0.2 | — | — | — | — | 0.3 | — | — | — | × | 2010 |
| Comp. Ex. 9 | 67 | — | 25 | — | 8 | — | — | 0.2 | — | 0.2 | — | — | 0.2 | — | — | — | — | — | 0.2 | — | — | △ | 1550 |
| Comp. Ex. 10 | 87 | — | 5 | — | 8 | — | — | 0.2 | — | 0.2 | — | — | 0.2 | — | — | 0.3 | — | — | — | 19400 | 3 | × | 1900 |
| Comp. Ex. 11 | 75 | — | 25 | — | — | — | — | 0.2 | — | 0.2 | — | — | 0.2 | — | — | 0.3 | — | — | — | 6000 | not broken | △ | 1370 |

Example 15

(1) Crystalline ethylene-propylene block copolymer (PP-1)
  (a) Ethylene content: 7.5% by weight
  (b) MFR 20 g/10 min . . . 67% by weight
(2) Ethylene-propylene copolymer rubber (EPR-1)
  (a) Ethylene content: 75% by weight
  (b) Mooney viscosity ($ML_{1+4}$ 100° C.) 20 . . . 25% by weight
(3) Talc (average particle diameter: 2.5 μm) . . . 8% by weight
(4) 100 parts by weight in total of the above materials (1), (2), and (3) were blended with the following materials:
  (1) Hindered phenolic antioxidant AO-3 . . . 0.3 part by weight
  (2) Organic sulfur type antioxidant SAO-1 . . . 0.03 part by weight
  (3) Hindered amine light stabilizer HALS-10 . . . 0.4 part by weight
  (4) Carbon black (pigment) . . . 0.1 part by weight
  (5) Magnesium stearate . . . 0.2 part by weight These materials were mixed by a Henschel mixer, melt-kneaded by a biaxial extruder set at 230° C., and pelletized to prepare a polypropylene resin composition.

The above-described polypropylene resin composition was injection-molded to prepare a flat plate test piece having a size of 50 mm×90 mm×2 mm for a measurement of the properties thereof.

The flat plate test piece was exposed to a saturated vapor of 1,1,1-trichloroethane for 30 sec, the surface thereof was washed, and the test piece then dried in an oven set at 90° C. for 10 min Thereafter, a plasma treatment was conducted. The conditions of the plasma treatment were as follows.

| Degree of vacuum | 1.0 Torr |
| Output of microwave | 0.05 kw |
| Treating time | 0.3 sec |
| Gas flow rate | 600 cc/min |
| Treating gas | air |

After the plasma treatment, the test piece was coated with a two-component polyurethane coating as a top coating, to a coating thickness of 40 μm. The coating was dried at 120° C. for 30 min, and allowed to stand at room temperature for 48 hr to prepare a coated product.

The coating property of the coated products was then evaluated. First, cross-cuts were provided in the coating of the test piece, by a cutter knife, to divide the coating into hundred 1 mm square sections, then Cello Tape ® was pressed thereover and peeled therefrom, and the number of sections at which the coating has peeled off was counted.

The coating property was evaluated as o when peeling occurred in none of the sections, Δ when peeling occurred in 1 to 10 sections among 100 sections, and x when peeling occurred in 11 sections or more a among 100 sections.

Further, the weather resistance was evaluated on a test piece subjected to the plasma treatment only. The evaluation of the weather resistance was conducted by measuring a time taken for a crack to become observable at a magnification of ×50, by using a sunshine weatherometer under the condition of a black panel temperature of 83° C.

A test piece was used for the measurement of the physical properties, and the bending modulus and Izod impact strength were measured. The bending modulus and Izod impact strength were measured according to ASTM D-790 (measurement temperature 23° C.), and ASTM D-258 (measurement temperature −30° C.), respectively.

The results of the measurements of the coating property and the physical properties are shown in Table 2.

Example 16

A composition was prepared, molded into a test piece, and the coating property and weathering resistance evaluated in the same manner as that of Example 15, except that HALS-3 was used as the hindered amine light stabilizer instead of HALS-1. The results are shown in Table 2. In this Example, no measurement was made of the bending modulus and Izod impact resistance.

Example 17

A composition was prepared, molded into a test piece, and the coating property and weathering resistance evaluated in the same manner as that of Example 15, except that HALS-2 was used a the hindered amine light stabilizer instead of HALS-1. The results are shown in Table 2. In this Example, no measurement was made of the bending modulus and Izod impact resistance.

Example 18

A composition was prepared, molded into a test piece, and the coating property and weathering resistance evaluated in the same manner as that of Example 15, except that the kinds and amounts of the additives were changed as shown in Table 2. In this Example, no measurement was made of the bending modulus and Izod impact resistance. The results are shown in Table 2.

Example 19

A composition was prepared, molded into a test piece, and the coating property and weathering resistance evaluated in the same manner as that of Example 18, the kinds and amounts of the additives were changed as shown in Table 2. In this Example, no measurement was made of the bending modulus and Izod impact resistance. The results are shown in Table 2.

Example 20

A 65% by weight amount of PP-2 having an ethylene content of 7.5% by weight and a MFR of 30 g/10 min was used as the crystalline ethylene-propylene block copolymer instead of PP-1. Further, the hydrogenation product of styrene-butadiene block copolymer rubber (SEBS) (manufactured by Shell Chemicals) was used as the thermoplastic elastomer and the amount of the talc added was reduced to 7% by weight and 3% by weight of fibrous MOS having an average fiber diameter of 0.3 μm and an average fiber length of 25 μm was used. A composition was prepared, molded into a test piece, and subjected to measurements of the bending modulus and Izod impact strength and an evaluation of the coating property and weathering resistance, in the same manner as that of Example 19, except for the above-described conditions. The results are shown in Table 2.

Comparative Example 12

A composition was prepared, molded into a test piece, and the coating property and weathering resistance evaluated in the same manner as that of Example 15, except that the hindered phenol antioxidant was not added. In this Comparative Example, no measurement was made of the bending modulus and Izod impact resistance. The results are shown in Table 2.

Comparative Example 13

A composition was prepared, molded into a test piece, and the coating property and weathering resistance evaluated in the same manner as that of Example 15, except that the organic sulfur type antioxidant was not added. In this Comparative Example, no measurement was made of the bending modulus and Izod impact resistance. The results are shown in Table 2.

Comparative Example 14

A composition was prepared, molded into a test piece, and the coating property and weathering resistance evaluated in the same manner as that of Example 15, except that the amount of the sulfur type antioxidant added was increased to 0.55 parts by weight. In this Comparative Example, no measurement was made of the bending modulus and Izod impact resistance. The results are shown in Table 2.

Comparative Example 15

A composition was prepared, molded into a test piece, and the coating property and weathering resistance evaluated in the same manner as that of Example 15, except that no hindered amine light stabilizer was added. In this Comparative Example, no measurement was made of the bending modulus and Izod impact resistance. The results are shown in Table 2.

Comparative Example 16

A composition was prepared, molded into a test piece, and the coating property and weathering resistance evaluated in the same manner as that of Example 15, except that HALS-5 having an N-H bond in the molecule was used as the hindered amine light stabilizer. In this Comparative Example, no measurement was made of the bending modulus and Izod impact resistance. The results are shown in Table 2.

Comparative Example 17

A composition was prepared, molded into a test piece, and the coating property and weathering resistance evaluated in the same manner as that of Example 18, except that 0.3 parts by weight of HALS-6 having an N-H bond in the molecule was used as the hindered amine light stabilizer. In this Comparative Example, no measurement was made of the bending modulus and Izod impact resistance. The results are shown in Table 2.

Comparative Example 18

A composition was prepared, molded into a test piece, and the coating property and weathering resistance evaluated in the same manner as that of resistance evaluated in the same manner as that of Example 18, except that 0.3 parts by weight of HALS-7 having an N-H bond in the molecule was used as the hindered amine light stabilizer. In this Comparative Example, no measurement was made of the bending modulus and Izod impact resistance. The results as shown in Table 2.

Comparative Example 19

A composition was prepared, molded into a test piece, and the coating property and weathering resistance evaluated in the same manner as that of Example 15, except that the amount of the hindered amine light stabilizer added was increased to 1.1 part by weight. In this Comparative Example, no measurement was made of the bending modulus and Izod impact resistance. The results are shown in Table 2.

Comparative Example 20

A composition was prepared, molded into a test piece, and the coating property and weathering resistance evaluated in the same manner as that of Example 15, except that 83% by weight of PP-1 was used as the crystalline ethylene-propylene block copolymer and 9% by weight of EPR-1 was used as the thermoplastic elastomer. The results are shown in Table 2.

Comparative Example 21

A composition was prepared, molded into a test piece, and the bending modulus and the Izod impact strength were measured and the coating property and weathering resistance were evaluated in the same manner as that of Example 15, except that 75% by weight of PP-1 was used as the crystalline ethylene-propylene block copolymer and that no talc was added. The results are shown in Table 2.

TABLE 2

| No. | Ex.15 | Ex. 16 | Ex. 17 | Ex. 18 | Ex. 19 | Ex. 20 | Com. Ex. 12 | Com. Ex. 13 |
|---|---|---|---|---|---|---|---|---|
| PP-1 | 67 | 67 | 67 | 67 | 67 | — | 67 | 67 |
| PP-2 | — | — | — | — | — | 65 | — | — |
| EPR-1 | 25 | 25 | 25 | 25 | 25 | — | 25 | 25 |
| SEBS | — | — | — | — | — | 25 | — | — |
| Talc | 8 | 8 | 8 | 8 | 8 | 7 | 8 | 8 |
| Fibrous MOS | — | — | — | — | — | 3 | — | — |
| AO-1 | — | — | — | 0.1 | 0.1 | 0.1 | — | — |
| AO-2 | — | — | — | 0.1 | 0.1 | 0.1 | — | — |
| AO-3 | 0.3 | 0.3 | 0.3 | 0.2 | 0.2 | 0.2 | — | 0.3 |
| SAO-1 | 0.03 | 0.03 | 0.03 | — | — | — | 0.03 | — |
| SAO-2 | — | — | — | 0.05 | 0.03 | 0.03 | — | — |
| HALS-1 | 0.4 | — | — | 0.35 | — | — | 0.4 | 0.4 |
| HALS-2 | — | — | 0.4 | — | — | — | — | — |
| HALS-3 | — | 0.4 | — | — | 0.35 | 0.35 | — | — |
| HALS-5 | — | — | — | — | — | — | — | — |
| HALS-6 | — | — | — | — | — | — | — | — |

TABLE 2-continued

| | | | | | | | | |
|---|---|---|---|---|---|---|---|---|
| HALS-7 | — | — | — | — | — | — | — | — |
| Modulus in bending (kg/cm$^2$) | 11500 | — | — | — | — | 12700 | — | — |
| Izod (kg · cm/cm) | 10 | — | — | — | — | 12 | — | — |
| Cross-cut peeling test | o | o | o | o | o | o | o | o |
| Crack generation time (Hr) | 1950 | 2000 | 1900 | 2070 | 2070 | 2040 | 1650 | 1650 |

| No. | Com. Ex. 14 | Com. Ex. 15 | Com. Ex. 16 | Com. Ex. 17 | Com. Ex. 18 | Com. Ex. 19 | Com. Ex. 20 | Com. Ex. 21 |
|---|---|---|---|---|---|---|---|---|
| PP-1 | 67 | 67 | 67 | 67 | 67 | 67 | 83 | 75 |
| PP-2 | — | — | — | — | — | — | — | — |
| EPR-1 | 25 | 25 | 25 | 25 | 25 | 25 | 9 | 25 |
| SEBS | — | — | — | — | — | — | — | — |
| Talc | 8 | 8 | 8 | 8 | 8 | 8 | 8 | 8 |
| Fibrous MOS | — | — | — | — | — | — | — | — |
| AO-1 | — | — | — | 0.1 | 0.1 | — | — | — |
| AO-2 | — | — | — | 0.1 | 0.1 | — | — | — |
| AO-3 | 0.3 | 0.3 | 0.3 | 0.2 | 0.2 | 0.3 | 0.3 | 0.3 |
| SAO-1 | 0.55 | 0.03 | 0.03 | — | — | 0.03 | 0.03 | 0.03 |
| SAO-2 | — | — | — | 0.05 | 0.05 | — | — | — |
| HALS-1 | 0.4 | — | — | — | — | 1.1 | 0.4 | 0.4 |
| HALS-2 | — | — | — | — | — | — | — | — |
| HALS-3 | — | — | — | — | — | — | — | — |
| HALS-5 | — | — | 0.4 | — | — | — | — | — |
| HALS-6 | — | — | — | 0.3 | — | — | — | — |
| HALS-7 | — | — | — | — | 0.3 | — | — | — |
| Modulus in bending (kg/cm$^2$) | — | — | — | — | — | — | 19000 | — |
| Izod (kg · cm/cm) | — | — | — | — | — | — | 3 | — |
| Cross-cut peeling test | x | o | x | x | x | x | x | Δ |
| Crack generation time (Hr) | 1030 | 350 | 2050 | 1900 | 1970 | 3300 | 1850 | 1300 |

The following is apparent from the above-described examples and comparative examples.

(1) A composition lacking any of the hindered phenolic antioxidant not containing nitrogen, nitrogen-containing hindered phenolic antioxidant, organic sulfur type antioxidant, benzotriazole ultraviolet absorber, and hindered amine light stabilizer has a poor weathering resistance.

(2) When the hindered amine light stabilizer does not satisfy the requirements specified in the present application, the composition has a poor coating property and a good adhesion of the coating cannot be attained even after a plasma treatment.

(3) Even when the composition contains all of the hindered phenolic antioxidant not containing nitrogen, nitrogen-containing hindered phenolic antioxidant, organic sulfur type antioxidant, benzotriazole ultraviolet absorber and hindered amine light stabilizer, the weathering resistance and coating property are unsatisfactory if the proportions of the above-described additives are outside the respective ranges specified in the present invention.

In the polypropylene resin composition of the present invention, use is made, as an antioxidant, of a combination of a hindered phenolic antioxidant not containing nitrogen with a nitrogen-containing hindered phenolic antioxidant in the first embodiment, and a combination of a hindered phenol antioxidant with an organic sulfur antioxidant in the second embodiment. Further, a hindered amine either having a molecular weight of 500 or more, or not having a N-H bond and a molecular weight of less than 500 is used as a light stabilizer. The composition of the present invention ensures that there is no substantial bleeding-out of the hindered amine light stabilizer onto the surface thereof, and therefore, the subsequent plasma treatment can be effectively conducted, and the coating property can be remarkably improved. Even if the bleeding out of, for example, the hindered amine light stabilizer occurs, the plasma treatment can be effectively carried out.

Accordingly, the composition of the present invention can satisfy the compatibility of the weathering resistance with the coating property currently demanded for bumper materials.

We claim:

1. A polypropylene resin composition having an improved coating property after plasma treatment and suitable for use for the production of a molded article coated after a plasma treatment comprising:
   (i) 100 parts by weight of a composition comprising:
      (a) 45 to 88% by weight of a crystalline ethylenepropylene block copolymer,
      (b) 10 to 35% by weight of a thermoplastic elastomer having a substantially saturated main chain, and
      (c) 2 to 25% by weight of an inorganic filler;
   (ii) 0.03 to 0.6 parts by weight of a hindered nitrogen-free phenolic antioxidant;
   (iii) 0.03 to 0.6 parts by weight of a nitrogen-containing hindered phenolic antioxidant;
   (iv) 0.03 to 0.5 parts by weight of a benzotriazole ultraviolet absorber; and
   (v) 0.05 to 1.0 parts by weight of a hindered amine light stabilizer having a molecular weight of at least 500 and no N-H bond.

2. A polypropylene resin composition as claimed in claim 1, wherein the crystalline ethylene-propylene block copolymer has an ethylene content of 5 to 25% by weight and an MFR of 10 to 70 g/10 min.

3. A polypropylene resin composition as claimed in claim 1, wherein the thermoplastic elastomer is at least one member selected from the group consisting of hydrogenated products of ethylene-propylene copolymer rubbers, ethylene-propylene-diene terpolymer rubbers, ethylene-butene copolymer rubbers, styrene-butadiene block copolymer rubbers, styrene-butadiene random copolymer rubbers, styrene-isoprene block copolymer rubbers, and styrene-isoprene random copolymer rubbers.

4. A propylene resin composition as claimed in claim 1, wherein the inorganic filler has an average size of 5 μm or less.

5. A process for preparing a polypropylene resin composition of claim 1 for receiving a surface coating comprising contacting said composition with a plasma.

* * * * *

UNITED STATES PATENT AND TRADEMARK OFFICE
CERTIFICATE OF CORRECTION

PATENT NO. : 5,354,795
DATED : October 11, 1994
INVENTOR(S) : Kohhei UENO et al.

It is certified that error appears in the above-indentified patent and that said Letters Patent is hereby corrected as shown below:

Claim 1, column 20, lines 36-37, change "ethylenepropylene" to --ethylene-propylene--.

Signed and Sealed this

Sixth Day of December, 1994

Attest:

BRUCE LEHMAN

Attesting Officer    Commissioner of Patents and Trademarks